United States Patent [19]
Miller et al.

[11] 3,725,692
[45] Apr. 3, 1973

[54] PHOTOGRAPHIC FLASHLAMP UNIT

[75] Inventors: Charles H. Miller; David R. Broadt; Donald E. Armstrong, all of Williamsport, Pa.

[73] Assignee: GTE Sylvania Incorporated

[22] Filed: Dec. 20, 1971

[21] Appl. No.: 209,962

[52] U.S. Cl..................................240/1.3, 240/46.59
[51] Int. Cl..............................................G03b 15/02
[58] Field of Search......240/1.3, 46.45, 46.49, 46.53, 240/46.59; 431/93, 94, 95, 97; 95/11 L

[56] References Cited

UNITED STATES PATENTS

| | | | |
|---|---|---|---|
| 2,857,752 | 10/1958 | Anderson et al. | 431/94 |
| 2,789,205 | 4/1957 | Schwartz et al. | 240/1.3 |
| 3,238,749 | 3/1966 | Reiber et al. | 240/1.3 X |
| 3,358,475 | 12/1967 | Bockenstedt | 240/1.3 |
| 3,386,360 | 6/1968 | Nerwin | 240/46.59 X |

Primary Examiner—John M. Horan
Assistant Examiner—Fred L. Braun
Attorney—Norman J. O'Malley et al.

[57] ABSTRACT

A flash cube having a strip of adhesive-backed transparent plastic tape wrapped about its transparent cover side walls to provide increased containment capability.

10 Claims, 2 Drawing Figures

PATENTED APR 3 1973 3,725,692

PHOTOGRAPHIC FLASHLAMP UNIT

BACKGROUND OF THE INVENTION

This invention relates to photographic flash units and more particularly to a unit containing a plurality of photoflash lamps mounted on a base and enclosed by a protective cover having light-transmitting side walls.

A currently popular flashlamp unit of this type is known generally in the trade as a flashcube, a specific embodiment of which is shown in U.S. Pat. No. 3,327,105, for example. It comprises a plurality of flashlamps, each with its own reflector, mounted on a base and enclosed within a transparent protective cover, each of the side walls of which defines a window for the lamp-reflector assembly located therein.

Each of the flashlamps used in the flashcube comprises: an hermetically sealed, light-transmitting envelope; a combustion-supporting gas, such as oxygen, contained in the envelope at a fill pressure many times higher than atmospheric; a quantity of filamentary combustible material, such as zirconium or hafnium, located within the envelope; and an ignition means, such as an electric filament in combination with a quantity of ignition paste.

In the continuing effort to provide additional improvements and capabilities in flash photography, flash units have been developed for providing significantly increased light output per unit of lamp volume. These gains have been achieved by a number of lamp design improvements including the use of increased amounts of filamentary combustible material, increased fill pressure, and/or various techniques for increasing the efficiency of combustion. As a result, the need arose to reinforce the protective transparent cover which encloses the flashlamps so as to increase its containment capability.

One method which has been employed to provide cover reinforcement comprises enclosing the flashcube in a wet, flexible tube of regenerated cellulose and then shrinking it onto the cube by a drying process. The dimensions of the cellulose tube are chosen so that, after drying, the cellulose material completely encloses the four transparent side walls of the flashcube cover and partly overlaps the base. This provides significant tensile and impact strength and when properly applied, the shrunken tube material will be under circumferential and axial tension and thus provide additional reinforcement.

The use of shrink tubing on a flashcube, however, poses a number of significant disadvantages. For example, one shortcoming is the tendency of the regenerated cellulose to reabsorb moisture under humid storage conditions. When this occurs, the strength and tension can decrease to such an extent that the reinforcing function of the tubing is reduced or lost completely. In addition, the resulting relaxed condition of the cellulose tubing which overlaps the flashcube base tends to interfere with the rotation of the flashcube on the camera. Also, use of the tubing results in a thicker window through which the light from an ignited flashlamp must travel and thus introduces additional losses in light output due to absorption. In addition, the cellulose material is not quite as clear as the transparent cover side walls and thus tends to further diminish the light-transmitting capability thereof. Light transmission is decreased also by the imperfect mating of the tubing to the cover, which is indicated by the spotty formation of Newton rings at the interface between the two. Further, the cost of the shrink tubing and its application in automatic, high speed production is relatively high.

Other methods which have been considered in an attempt to enhance containment include the use of thicker or stronger lacquer coatings on the lamps, using thicker walls on the protective cover, or forming the cover of different materials. But these approaches also have drawbacks. For example, use of a thicker coating of lacquer on the lamps is dependent upon the availability of the additional space required by the resulting increase in the size of the lamp, and even then, unless the lacquer is moisture proof, the gain can be nullified in the event of exposure to humid conditions. In like manner, the use of thicker-walled covers, made of materials such as polystyrene, will not accomplish the desired purpose within the size limitations commonly encountered, while the use of a substitute cover material is likely to be undesirable because of molding problems, difficulties in sealing the cover to the base, increased cost, and reduced light transmission.

SUMMARY OF THE INVENTION

Accordingly, it is an object of the present invention to provide an improved photographic flashlamp unit in which the enclosing cover has an increased containment capability.

A principal object of the invention is to provide a photographic flashlamp unit having a transparent protective cover which is reinforced to provide increased containment capability without diminishing the light-transmitting capability thereof.

Another object of the invention is to provide economical means for reinforcing the transparent cover of a flashcube which will withstand elevated temperatures and humidity and not interfere with rotation of the flashcube on a camera.

Briefly, these objects are attained in accordance with the present invention by covering the one or more light-transmitting side walls of the flashlamp unit with an adhesive-backed sheet of light-transmitting plastic material which is selected to increase the containment capability of the enclosing cover without diminishing the light-transmitting capability of the side walls. In a preferred embodiment, a strip of very clear polypropylene tape, with adhesive backing, is wrapped about the transparent polystyrene side walls of a flashcube, with the tape ends being overlapped about one of the corners of the cube. Surprisingly, a flashcube reinforced in this manner can actually exhibit a higher light output than is obtainable from the same unit without the tape wraparound.

BRIEF DESCRIPTION OF THE DRAWINGS

This invention will be more fully described hereinafter in conjunction with the accompanying drawings in which.

DESCRIPTION OF THE PREFERRED EMBODIMENT

Figure 1:
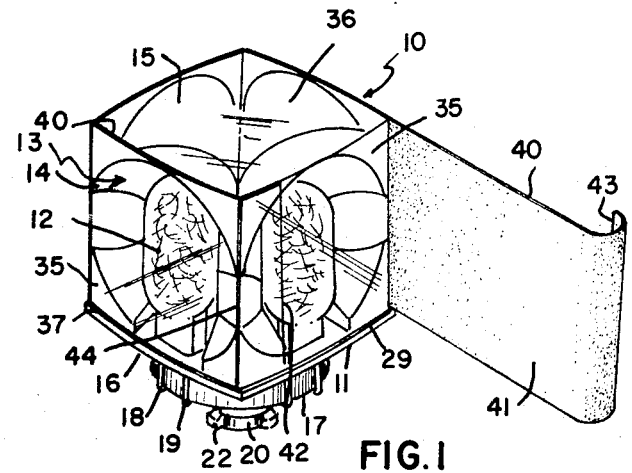
FIG. 1 is a perspective view of a flashcube having a strip of transparent adhesive tape partially wrapped about its cover side walls in accordance with the invention.
Figure 2:
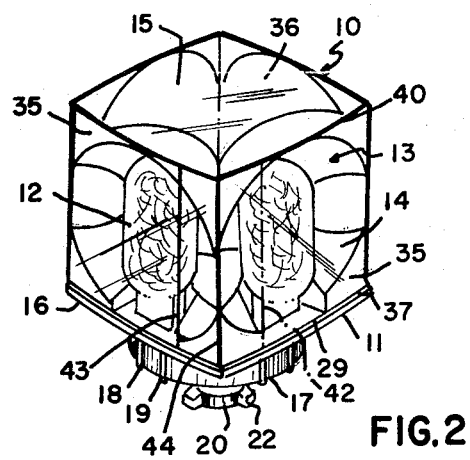
FIG. 2 is a perspective view of the flashcube of FIG. 1 with the tape wraparound completed and particularly showing the overlapping ends of the tape about the corner of the flashcube.

Referring to FIGS. 1 and 2 the present invention is illustrated as applied to a flashcube 10 of the type described in U.S. Pat. No. 3,327,105. The flashcube includes a base member 11 having four flashlamps 12 vertically mounted on its upper surface. Base member 11 is shaped to form a platform support 16 of substantially square shape, and the flashlamps 12 are orthogonally spaced about a central axis of the platform support 16 with each lamp positioned symmetrically with respect to one of the four lateral edges thereof. Each flashlamp 12 comprises an hermetically sealed, light-transmitting glass envelope containing a combustion-supporting gas under pressure and a charge of ignitable material which produces an amount of light of selected peak level and duration when ignited by connection to a source of electrical potential.

Disposed between and separating the flashlamps 12 is a reflector 13 of preformed sheet material having a light reflective coating and defining an inwardly dished, individual light reflector surface 14 of suitable shape for each of the four flashlamps 12. Upon ignition of one of the flashlamps 12, the reflector surface 14 disposed behind that flashlamp defines a pattern of emitting light from that lamp along a line extending radially outward from the respective lateral edge of support 16.

Integrated with and extending downwardly from the support 16 is an annular contact ring 17. A pair of electrical lead-in wires 18 and 19 extend from the interior of the glass envelope of each flashlamp 12 at its lower end in a manner which is known in the art. The lead-in wires 18 and 19 pass downwardly through the platform support 16 and are wrapped by bending around both sides of the annular contact ring 17.

Centrally disposed within the area defined by the contact ring 17 and coaxial therewith is a depending cylindrical center post or spindle 20 which is also formed integrally with the base platform support 16. The center post includes four radially extending lugs 22 uniformly spaced about the circumference of the post 20 at its lower end. By means of the center post and contact ring, the flashcube 10 is connectable with a suitable receiving socket in a photographic camera for providing selective electrical connection with the contact terminals of the flash circuit in the camera and the leads 18 and 19 corresponding to one of the flashlamps 12.

A transparent or light-transmitting cover 15 is provided as a protective shield for enclosing the lamps 12 and the reflector 13. The cover 15 is preferably made of a single molded piece of inexpensive plastic, such as polystyrene, and comprises four side walls 35 of rectangular shape bowed slightly outwardly, and a top wall 36 having substantially a square shape like that of the base platform support 16. The common bottom edge 37 of the cover 15 is permanently affixed to the base platform support 16 at the outer edges of sealing rims 29 which are formed in the platform support, which typically may be constructed of plastic material, such as an impact grade polystyrene, by injection molding. For example, the cover may be affixed to the base by adhesive, heat sealing, or sonic sealing. In this manner, each of the cover side walls 35 is adjacent a corresponding one of the lateral edges of the platform support 16 and functions as a window for the flashlamp positioned on that side of the unit. The cover 15 provides containment and protection of the internal cube elements.

In accordance with the present invention, a strip of transparent plastic tape 40 having an adhesive backing 41 is tension-wrapped about the four transparent side walls 35 of the flashcube to reinforce cover 15 and thereby increase its containment capability. FIG. 1 illustrates a flashcube in the process of being wrapped, with the tape fully covering and adhesively secured to three of its side walls. As shown in FIG. 2, the flashcube wraparound is completed by overlapping the two ends 42 and 43 of the plastic tape 40 about a corner 44 of the cover 15 at the juncture of two of the transparent side walls 35, with the extension of the overlap being approximately symmetrical about each side of the corner 44. Such an overlap arrangement maximizes the containment strength of this single layer method of tape reinforcement. The edges of tape 40 preferably extend to, but do not overlap, the top 36 or base 11, although in certain applications greater coverage may be desired. Also, while a single layer of the tape is preferred, except for the overlap, it may be desirable in some applications to use a multiple layer wrapping. That is, the tape 40 may be wrapped a plurality of times about the four cover side walls 35 whereby a plurality of sheets of the transparent plastic tape material cover each of the side walls.

In addition it is possible to color the polypropylene tape or its adhesive blue by means of appropriate pigmentation agents. Use of a blue tinted wraparound would then make it unnecessary to provide each flashlamp with a blue colored coating for filtering the light therefrom.

In testing the effect of the tape reinforcement upon the light-transmitting capability of the flashcube, it has been discovered quite unexpectedly that the laminated transparent side wall, comprising cover side wall 35 with the strip of clear, untinted plastic tape 40 adhesively secured thereto, can actually transmit a higher light output, upon ignition of the flashlamp 12 facing that side wall, than is obtainable from a like flashcube without the tape wraparound. Normally, one would expect a loss of light by absorption due to the added layer of plastic material. In the case of a flashcube reinforced in accordance with the invention, however, it appears that the adhesive 41 tends to fill in any exterior surface scratches in the side walls 35 of cover 15, and tape 40 provides a much smoother exterior surface, to thereby minimize light loss by diffusion to an extent which more than offsets absorption losses.

While tapes of various types may be used for this purpose, we have had very successful results by using a clear polypropylene tape having a moisture and heat resistant adhesive backing, and which, together with its adhesive, is just over 0.002 inch thick and has an elongation of approximately 70 percent. This thickness provides the required strength, and the elongation permits the tape to conform to irregularities in the cube, such as the draft or taper of the cover, and lack of alignment of the edges of the base with the sides of the cover. In order to supply the necessary reinforcement, the tape should possess a tensile strength near 40 pounds per inch of width, and an adhesion of approximately 30 ounces per inch of width. The tape and adhesive should be resistant to changes in physical characteristics from exposure to all normally encountered conditions, such as extremes of temperature and humidity, for extended periods of time. For example, one tape possessing these characteristics and found suitable for this application is type P–910 J–LAR, available from Permacel, a Johnson and Johnson company, New Brunswick, N. J. 08903.

As a demonstration of the beneficial effects upon light output of the described tape overwrap, 75 unwrapped flashcubes were divided into three groups of 25 each. One of the groups was left unwrapped, another was provided with a single layer of the preferred tape, and the third group was wrapped with two layers of tape. In neither the second nor the third group was an additional overlap provided at the tape ends. After allowing about three days for the adhesive to flow into cover irregularities, and for any entrapped air to work its way out as a result of the tension in the tape, light output was measured for each lamp. The findings indicate that the average total light output not only is not reduced by the single layer of tape on the cover face in front of the lamp, or by the use of two layers of tape, but surprisingly, that it can even be increased by the addition of the tape. The improvement probably results from a reduction in light scattering at the outer cover surface as a result of the adhesive flow into irregularities in the cover surface as mentioned earlier.

Although the invention has been described with respect to a specific embodiment, it will be appreciated that modifications and changes may be made by those skilled in the art without departing from the true spirit and scope of the invention. For example, in lieu of adhesive-backed tape, the cover reinforcement may be provided by a sheet of flexible or unflexible plastic which is secured to the flash unit cover by a layer of adhesive previously applied to the cover. The invention is applicable to flash units containing either electrically or percussively ignited flash lamps. Further, while the invention has been described with respect to flashcubes, it will be understood that the use of an adhesively secured plastic sheet to attain the aforementioned advantages may also be employed with other types of photographic flash units, such as single-lamp units, multiple-lamp strips, linear arrays of lamps, multi-level or bidirectional arrays of lamps, belts of lamps, etc.

What we claim is:

1. A photographic flashlamp unit comprising, in combination, a base member, at least one flashlamp mounted on said base member, an integral protecting cover affixed to said base member and enclosing said flashlamp, said cover having a top wall and at least one light-transmitting side wall, and at least one sheet of light-transmitting plastic material covering the light-transmitting side wall of said cover and adhesively secured thereto, said sheet of plastic material being selected to increase the containment capability of said cover.

2. A flashlamp unit according to claim 1 wherein the side wall of said cover is transparent, and said sheet of plastic material comprises a strip of adhesive-backed transparent tape.

3. A flashlamp unit according to claim 2 wherein said cover is formed of polystyrene, and said strip of transparent tape comprises a strip of polypropylene with an adhesive backing.

4. A flashlamp unit according to claim 2 wherein a plurality of flashlamps are mounted on said base member, said cover encloses said flashlamps and has a plurality of light-transmitting side walls, and said strip of adhesive-backed tape is wrapped about the side walls of said cover with the ends of said strip of tape overlapped to enhance the strength of containment.

5. A flashlamp unit according to claim 1 wherein a plurality of flashlamps are mounted on said base member, said cover encloses said flashlamps and has a plurality of light-transmitting side walls, said base member comprises a horizontal platform support having a plurality of lateral edges, said flashlamps are vertically mounted on the upper surface of said platform support about a central vertical axis thereof, each flashlamp being positioned symmetrically with respect to one of the lateral edges of said support, said unit further includes reflector surface means disposed behind each of said flashlamps for emitting light from that flashlamp along a line extending radially outwardly from the respective one of said lateral edges, and said protective cover is affixed to said platform support and encloses said flashlamps with each of the side walls of said cover being adjacent a corresponding one of said lateral edges.

6. A flashlamp unit according to claim 5 wherein said sheet of plastic material comprises a strip of adhesive-backed tape, said strip of tape being wrapped about all of the side walls of said cover with the ends of said strip of tape overlapped to enhance the strength of containment.

7. A flashlamp unit according to claim 6 wherein the side walls of said cover are transparent, said strip of adhesive-backed tape is transparent, and the ends of said strip of transparent tape are overlapped about a corner of said cover at the juncture of two of said transparent side walls, the extension of said overlap being approximately symmetrical about each side of said corner.

8. A flashlamp unit according to claim 7 wherein said cover is formed of polystyrene, and said strip of transparent tape comprises a strip of polypropylene with an adhesive backing.

9. A flashlamp unit according to claim 5 wherein said sheet of plastic material comprises a strip of adhesive-backed tape, and said strip of tape is wrapped a plurality of times about all of the side walls of said cover whereby a plurality of sheets of said light-transmitting plastic material cover each of said side walls.

10. A flashlamp unit according to claim 1 wherein said sheet of plastic material is transparent and has a blue color for filtering the light transmitted therethrough.

* * * * *